United States Patent
Karkun

(10) Patent No.: US 10,956,195 B2
(45) Date of Patent: Mar. 23, 2021

(54) VIRTUAL MACHINE MIGRATIONS ACROSS CLOUDS ASSISTED WITH CONTENT BASED READ CACHING

(71) Applicant: VMWARE, INC., Palo Alto, CA (US)

(72) Inventor: Pavan Karkun, Bengaluru (IN)

(73) Assignee: VMware, Inc., Palo Alto, CA (US)

( * ) Notice: Subject to any disclaimer, the term of this patent is extended or adjusted under 35 U.S.C. 154(b) by 198 days.

(21) Appl. No.: 15/655,938

(22) Filed: Jul. 21, 2017

(65) Prior Publication Data

US 2018/0314542 A1    Nov. 1, 2018

(30) Foreign Application Priority Data

Apr. 26, 2017 (IN) .............................. 201741014788

(51) Int. Cl.
| | | |
|---|---|---|
| G06F 9/455 | (2018.01) | |
| G06F 16/13 | (2019.01) | |
| G06F 16/172 | (2019.01) | |
| G06F 16/188 | (2019.01) | |
| H04L 29/08 | (2006.01) | |

(52) U.S. Cl.
CPC ........ *G06F 9/45558* (2013.01); *G06F 16/137* (2019.01); *G06F 16/172* (2019.01); *G06F 16/188* (2019.01); *H04L 67/1097* (2013.01); *H04L 67/2842* (2013.01); *G06F 2009/4557* (2013.01); *G06F 2009/45583* (2013.01); *G06F 2009/45595* (2013.01)

(58) Field of Classification Search
None
See application file for complete search history.

(56) References Cited

U.S. PATENT DOCUMENTS

| | | | | |
|---|---|---|---|---|
| 10,133,593 B1* | 11/2018 | Sethuramalingam | ....................... G06F 9/45558 |
| 2010/0138827 A1* | 6/2010 | Frank | ................... G06F 9/45558 718/1 |
| 2011/0131568 A1* | 6/2011 | Heim | .................... G06F 9/4856 718/1 |
| 2015/0242159 A1* | 8/2015 | Tsirkin | .................. G06F 3/0647 711/162 |
| 2015/0356108 A1* | 12/2015 | Kamei | .................. G06F 12/084 707/769 |

(Continued)

*Primary Examiner* — Meng Ai T An
*Assistant Examiner* — Zujia Xu
(74) *Attorney, Agent, or Firm* — Patterson + Sheridan, LLP

(57) ABSTRACT

One or more embodiments provide techniques for migrating a virtualized computing instance between source and destination virtualized computing systems. A migration assist agent creates a content based read cache (CBRC), which generates one or more digest files. Each of the one or more digest files corresponds to a container file. The migration assist agent transmits CBRC metadata and the one or more digest files to the destination virtualized computing system. The migration assist agent transmits one or more pages belonging to the CBRC to the destination virtualized computing system. For each container file, the migration assist agent references the digest file corresponding to the container file with the CBRC to determine if a hash value is in the CBRC. Responsive to determining that the hash value in the digest file is in the CBRC, the migration assist agent marks the container file as complete.

16 Claims, 4 Drawing Sheets

(56) References Cited

U.S. PATENT DOCUMENTS

2015/0381589 A1* 12/2015 Tarasuk-Levin .... H04L 63/0428
713/193
2016/0197986 A1* 7/2016 Chambliss .......... G06F 9/45558
709/213
2017/0255401 A1* 9/2017 Basham ................ G06F 3/0647

* cited by examiner

VIRTUAL MACHINE MIGRATIONS ACROSS CLOUDS ASSISTED WITH CONTENT BASED READ CACHING

RELATED APPLICATION

Benefit is claimed under 35 U.S.C. 119(a)-(d) to Foreign Application Serial No. 201741014788 filed in India entitled "VIRTUAL MACHINE MIGRATIONS ACROSS CLOUDS ASSISTED WITH CONTENT BASED READ CACHING", filed on Apr. 26, 2017 by VMware, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capability from both private and public clouds. A private cloud can include one or more customer data centers (referred to herein as "private data centers"). The public cloud can include a multi-tenant cloud architecture providing IaaS cloud services.

SUMMARY

One or more embodiments provide techniques for migrating a virtualized computing instance between source and destination virtualized computing systems. The cloud computing system executes a first migration workflow in the source virtualized computing system, where a host computer in the source virtualized computing system executing the virtualized computing instance is a source host in the first migration workflow. A migration assist agent creates a content based read cache (CBRC), which generates one or more digest files. Each of the one or more digest files corresponds to a container file in the first migration workflow. The migration assist agent transmits CBRC metadata and the one or more digest files from the source virtualized computing system to the destination virtualized computing system. The migration assist agent transmits one or more pages belonging to the CBRC to the destination virtualized computing system. For each container file to be transmitted to the destination virtualized computing system, the migration assist agent references the digest file corresponding to the container file with the CBRC to determine if a hash value in the digest file is in the CBRC. Responsive to determining that the hash value in the digest file is in the CBRC, the migration assist agent marks the container file as complete, and does not transmit the container file to the destination virtualized computing system.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
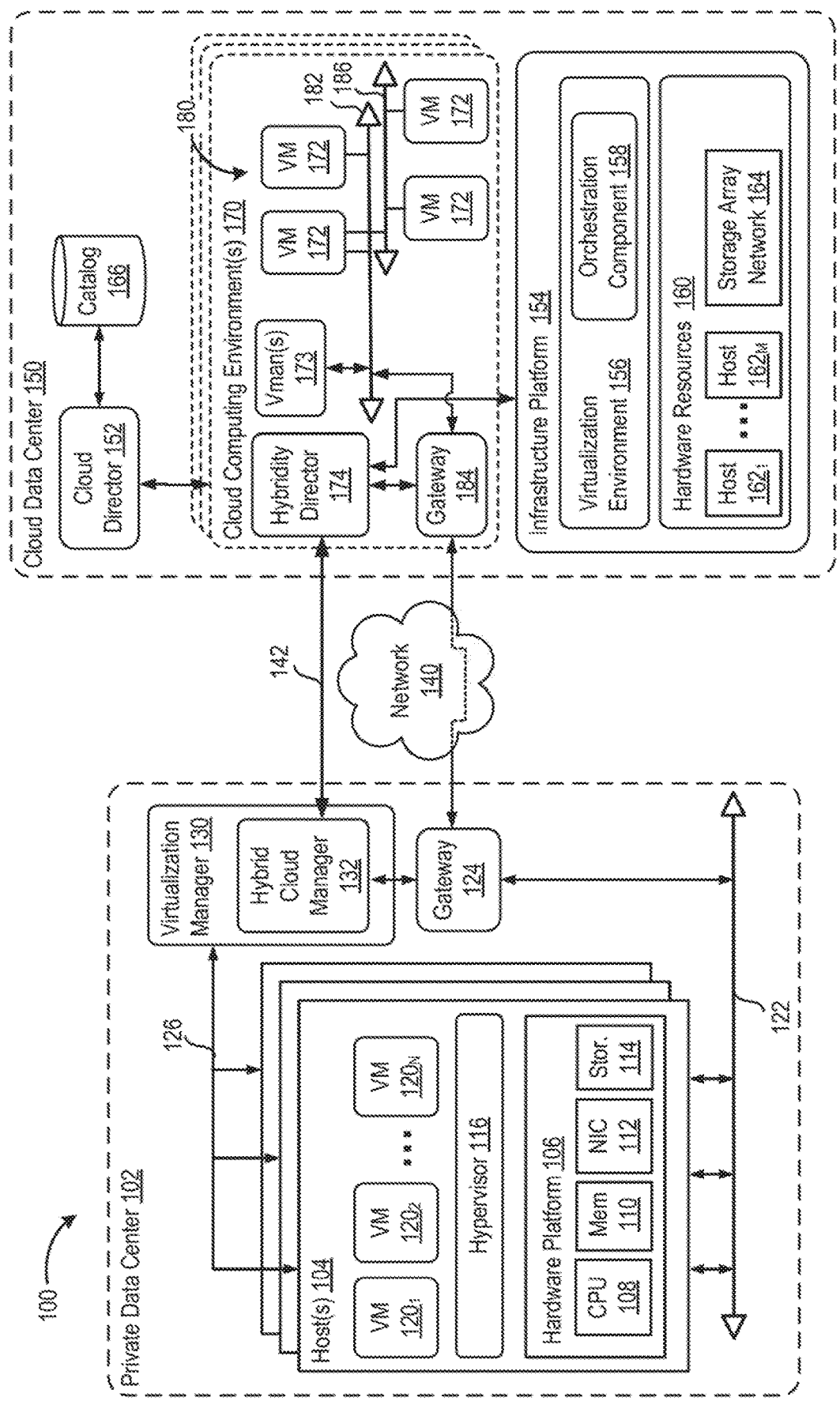
FIG. 1 is a block diagram of a hybrid cloud computing system, according to one embodiment disclosed herein.

FIG. 1 is a block diagram of a hybrid cloud computing system 100 in which one or more embodiments of the present disclosure may be utilized. Hybrid cloud computing system 100 includes a virtualized computing system implementing a private data center 102 and a virtualized computing system implementing a cloud data center 150. Hybrid cloud computing system 100 is configured to provide a common platform for managing and executing virtual workloads seamlessly between private data center 102 and cloud data center 150. In one embodiment, private data center 102 may be a data center controlled and administrated by a particular enterprise or business organization, while cloud data center 150 may be operated by a cloud computing service provider and exposed as a service available to account holders, such as the particular enterprise in addition to other enterprises. As such, private data center 102 may sometimes be referred to as a "private" cloud, and cloud data center 150 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Private data center 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within private data center 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

Private data center 102 includes a virtualization management component (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in private data center 102, or alternatively, running as a VM in one of hosts 104. One example of a virtualization manager is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud data center 150 with virtualized computing resources of computing system 102 to form a unified "hybrid" computing platform. Hybrid cloud manager 132 is configured to deploy VMs in cloud data center 150, transfer VMs from virtualized computing system 102 to cloud data center 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in private data center 102 with connectivity to an external network 140 (e.g., Internet). Gateway 124 may manage external public IP addresses for VMs 120 and route traffic incoming to and outgoing from private data center 102 and provide networking services, such as firewalls, network address translation (NAT), dynamic host configuration protocol (DHCP), load balancing, and virtual private network (VPN) connectivity over a network 140.

In one or more embodiments, cloud data center 150 is configured to dynamically provide an enterprise (or users of an enterprise) with one or more virtual data centers 170 in which a user may provision VMs 120, deploy multi-tier applications on VMs 120, and/or execute workloads. Cloud data center 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud data center 150 may in fact be distributed across multiple data centers in different locations.

Each cloud computing environment 170 is associated with a particular tenant of cloud data center 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud data center 150). In other embodiments, cloud computing environment 170 may be configured as part of a multi-tenant cloud service with logically isolated virtualized computing resources on a shared physical infrastructure. As shown in FIG. 1, cloud data center 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to private data center 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud data center 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 1, cloud computing environment 170 supports the creation of a virtual data center 180 having a plurality of virtual machines 172 instantiated to, for example, host deployed multi-tier applications, as well as one or more virtualization managers 173 (abbreviated as "Vman(s)"). A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160. Virtualization managers 173 can be configured similarly to virtualization manager 130.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within private data center 102. In other embodiments, gateway 184 may be configured to connect to communicate with private data center 102 using a high-throughput, dedicated link (depicted as a direct connect 142) between private data center 102 and cloud data center 150. In one or more embodiments, gateways 124 and 184 are configured to provide a "stretched" layer-2 (L2) network that spans private data center 102 and virtual data center 180, as shown in FIG. 1.

While FIG. 1 depicts a single connection between private gateway 124 and cloud-side gateway 184 for illustration purposes, it should be recognized that multiple connections between multiple private gateways 124 and cloud-side gateways 184 may be used. Furthermore, while FIG. 1 depicts a single instance of a gateway 184, it is recognized that gateway 184 may represent multiple gateway components within cloud data center 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud data center 150 may be used to manage all public-facing traffic incoming and outgoing from cloud data center 150.

In one embodiment, each virtual data center 180 includes a "hybridity" director module (depicted as hybridity director 174) configured to communicate with the corresponding hybrid cloud manager 132 in private data center 102 to enable a common virtualized computing platform between private data center 102 and cloud data center 150. Hybridity director 174 (e.g., executing as a virtual appliance) may communicate with hybrid cloud manager 132 using Internet-based traffic via a VPN tunnel established between gateways 124 and 184, or alternatively, using direct connection 142. In one embodiment, hybridity director 174 may control gateway 184 to control network traffic into virtual data center 180. In some embodiments, hybridity director 174 may control VMs 172 and hosts 162 of cloud data center 150 via infrastructure platform 154.

In an embodiment, hybrid cloud computing system 100 is configured for cross-system VM migration between virtualized computing systems, such as cross-cloud VM migration between on-premise data center 102 and cloud data center 150. In one example, on-premise data center 102 is the migration source and cloud data center 150 is the migration destination. Alternatively, cloud data center 150 can be the migration source and on-premise data center 102 can be the migration destination. For purposes of clarity by example, embodiments of cross-cloud VM migration are described below with respect to the on-premise data center 102 being the migration source and the cloud data center 150 being the migration destination. It is to be understood that the migration can be reversed using the same techniques.

Figure 2:
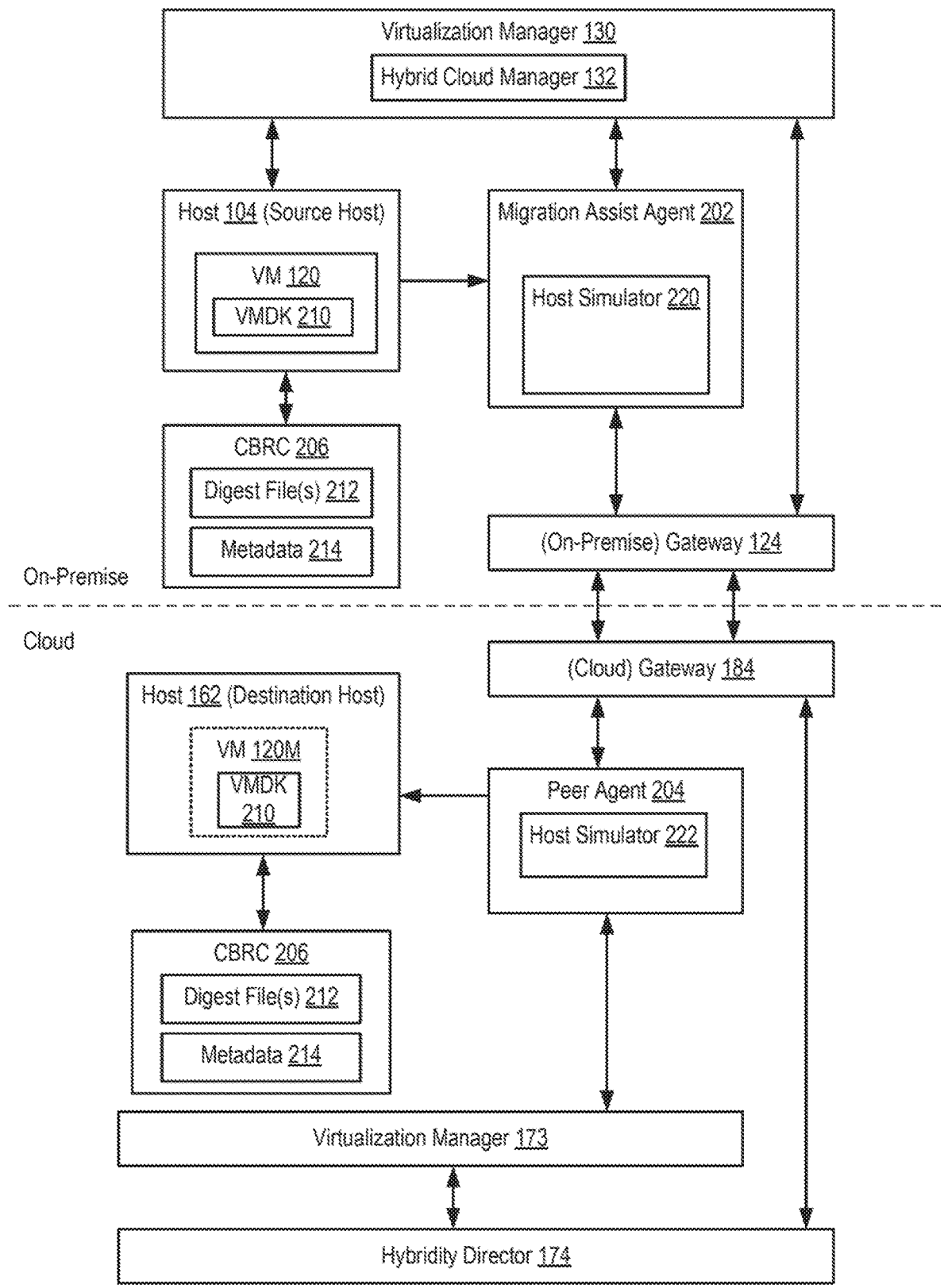
FIG. 2 is a logical diagram of the hybrid cloud computing system of FIG. 1, according to one embodiment disclosed herein.

Cross-cloud VM migration described herein enables users to seamlessly move VMs between their on-premise data centers and the public cloud. Cross-cloud VM migration includes both "cold migration" in which the VM is powered off during migration, as well as "hot migration" in which the VM is powered on during migration. FIG. 2 is a block diagram showing logical connections and dataflow among various components in a hybrid cloud with respect to a cross cloud VM migration, according to one embodiment. Elements in FIG. 2 that are the same or similar to those of FIG. 1 are designated with identical reference numerals. As shown in FIG. 2, a VM 120 executing on a host 104 ("source host") in on-premise data center 102 is to be migrated to cloud data center 150. VM 120 and host 104 are managed by virtualization manager 130.

To facilitate cross-cloud VM migration, on-premise data center 102 is configured with a migration assist agent 202 and the cloud data center 150 is configured with a peer agent 204. Typically, cloud services require multiple VMs to work together to support the overall functionality. Many of these VMs are similar, and much of the content that belongs to the VMs is the same. For example, one or more VMs may share operating system (OS) modules, device drivers, and the like. The migration assist agent 202 and peer agent 204 aid in achieving a lightweight migration by abstracting the implementation of caching techniques of heterogeneous clouds to optimize the amount of data sent during migration. Both the migration assist agent 202 and the peer agent 204 may be run in the form of a VM. The migration assist agent 202 maintains a per migration session specific information that is uses to communicate with the peer agent 204 on the cloud data center 150.

To utilize the identical nature of VMs in the migration process, a content based read cache (CBRC) 206 is used. The CBRC 206 is a random access memory based read cache that helps multiple VMs with identical memory contents to use the physical host RAM effectively, by sharing the identical memory pages (referred to herein as "pages") across multiple VMs. When the CBRC 206 is enabled on a virtual disk (e.g., VMDK 210), the CBRC 206 builds an on disk hash called a digest file 212. The digest file provides a signature of the contents of the memory. When a memory load request in the form of page fault appears, the CBRC 206 first references the digest file and compares the hash with the in memory cache. If a page with the content is already present in the memory, the CBRC 206 returns the same to the VM. The migration assist agent 202 works with the CBRC 206. The migration assist agent 202 has prior knowledge of the hashing function used for generating digest files 212 by the CBRC 206.

Referring back to FIG. 2, in one embodiment, the migration assist agent 202 may be used as a destination of an on-premise VM migration. From the perspective of the on-premise data center 102, a target VM is migrated locally to migration assist agent 202. Peer agent 204 may be used as a source of a cloud VM migration. From the perspective of the cloud data center 150, peer agent 204 is a source VM to be migrated locally to a target host. Each of the migration assist agent 202 and the peer agent 204 includes a host simulator 220, 222, respectively, executing within an OS. That is, the migration assist agent 202 can simulate a host 104 in on-premise data center 102, and peer agent 204 can simulate a host 162 in cloud data center 150. A host simulator can simulate a host computer in terms of receiving and transmitting the appropriate messages to a virtualization manager than makes it appear as an actual host computer eligible for hosting VMs. For example, the host simulator 220 may simulate the remote host as an ESX host on the same site as the source VM. The combination helps achieve migration of virtual machines across clouds that are built on the VMware software stack. Thus, the on-premise data center 102 and the cloud data center 150 can be heterogeneous in terms of their implementation.

Figure 3:
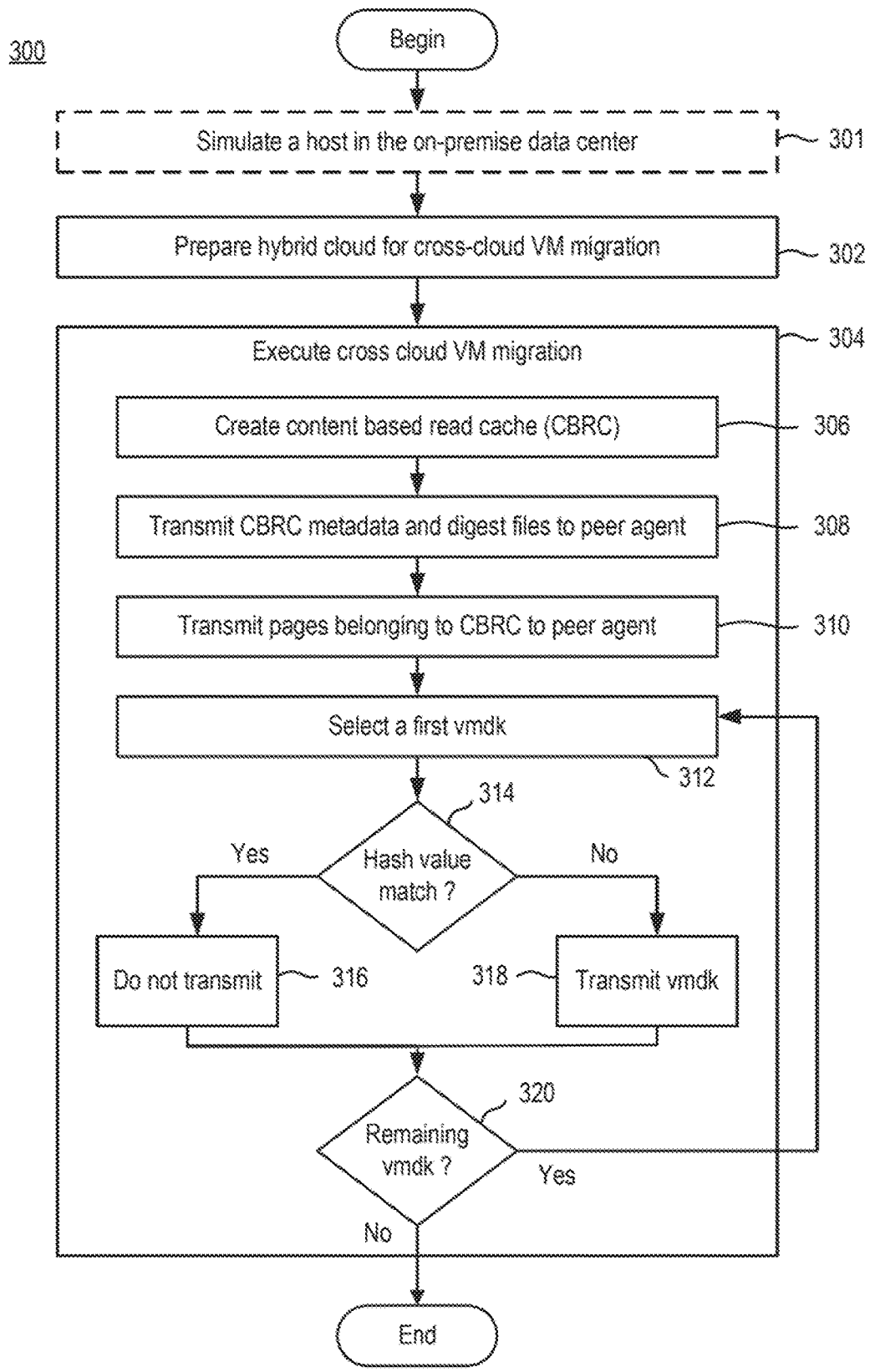
FIG. 3 is a flowchart illustrating a method of the high-level steps performed by a migration assist agent on the on-premise data center of FIG. 1, according to one embodiment disclosed herein.

FIG. 3 is a flowchart illustrating a method 300 of the high-level steps performed by the migration assist agent 202 on the on-premise data center 102. At step 302, hybrid cloud computing system 100 prepares for cross-cloud VM migration. As shown in FIG. 2, a VM 120, executing on a host 104 (the "source host") in on-premise data center 102, is to be migrated to cloud data center 150. VM 120 and host 104 are managed by virtualization manager 130. VM 120 includes a virtual machine disk file (vmdk) 210. The vmdk 210 stores contents of the VM's 120 hard disk drive.

Referring to FIG. 3, at step 304, hybrid cloud computing system 100 executes cross-cloud VM migration to migrate VM 120 from on-premise data center 102 to cloud data center 150. Step 304 includes sub-steps 306-320. At sub-step 306, the migration assist agent 202 creates a content based read cache (if not already created). For example, the migration assist agent 202 creates the CBRC 206 in FIG. 2. The creation of the CBRC 206 generates the one or more digest files 212. A digest file 212 is generated for each of the VM's 120 vmdk 210. Each digest file 212 comprises hash values for blocks in the vmdk 210 as well as a key (e.g., file name), corresponding to each hash value. In one example, the workload may be a virtual desktop infrastructure (VDI). The VDI is a virtualization technology that hosts a desktop operating system on a centralized server in a data center, such as on-premise data center 102. The VDI may be comprised of thousands of VMs. For example, the VDI may include a VM 120 and one or more delta disks, each of the VM 120 and the one or more delta disks having a vmdk corresponding thereto. Generally, there is a one-to-one correspondence between digest files and vmdk files.

At sub-step 308, the migration assist agent 202 transmits the CBRC metadata 214 and the digest files 212 over to the peer agent 204 on the cloud data center 150. The CBRC metadata 214 includes the contents of memory. For example, the metadata 214 includes RAM buffers, hash files already loaded into memory, information on how to generate the data structures for each vmdk, and the like.

At sub-step 310, the migration assist agent 202 transmits the pages belonging to the CBRC 206 to the peer agent 204 on the cloud data center 150. The pages belonging to the CBRC 206 includes all of the actual file contents of the CBRC 206. At sub-step 312, the migration assist agent 202 begins transmitting the respective vmdks 210 for each VM 120. For example, the migration assist agent 202 begins by selecting a first vmdk 210 for a first VM 120. At sub-step 314, for each vmdk 210 to be transmitted from the on-premise data center 102 to the cloud data center 150, the migration assist agent 202 references the digest file corresponding to the vmdk 210 with the CBRC 206 to determine if the hash value in the digest file 212 is already in the cache. Referencing the digest file 212 corresponding to the vmdk 210 against the CBRC 206 ensures that duplicate data is not being transferred from the on-premise data center 102 to the cloud data center 150. Thus, only unique pages are transmitted from the migration assist agent 202 to the peer agent 204.

If the migration assist agent 202 determines that the digest file corresponding to the vmdk has a hash value already in the CBRC, then at sub-step 316 the migration assist agent 202 marks the vmdk has "complete", and does not transmit the vmdk from the on-premise data center 102 to the cloud data center 150. If, however, the migration assist agent 202 determines that the digest file corresponding to the vmdk has a hash value that is not in the CBRC, then at sub-step 318 the migration assist agent 202 transmits the vmdk from the on-premise data center 102 to the cloud data center 150. Thus, only those vmdks whose corresponding digest files do not have a hash value found in the CBRC are transmitted during the migration process.

At sub-step 320, the migration assist agent 202 determines whether there are any additional vmdks to be transmitted from the on-premise data center 102 to the cloud data center 150. If the migration assist agent 202 determines that there are additional vmdks to be transmitted, the method 300 reverts to sub-step 314 to determine whether a remaining vmdk file is a duplicate file. If the migration assist agent 202 determines that there are no remaining vmdks to be transmitted, the method 300 ends.

In some embodiments, method 300 may include step 301. At step 301, the host simulator 220 in the migration assist agent 202 simulates a host 104 in the on-premise data center 102. For example, the host simulator can simulate the host 104 in terms of receiving and transmitting the appropriate messages to a virtualization manager that makes it appears as an actual host computer eligible for hosting VMs. As such, the host simulator 220 can simulate the host 104 as one that is compatible with a host 162 in the cloud data center 150. For example, if a host 162 in the cloud data center 150 is an ESX host, the host simulator 220 can simulate the host 104 to be an ESX host as well. The compatibility helps achieve migration of virtual machines across clouds that are built on the VMware software stack. Thus, the on-premise data center 102 and the cloud data center 150 can be heterogeneous in terms of their implementation.

Figure 4:
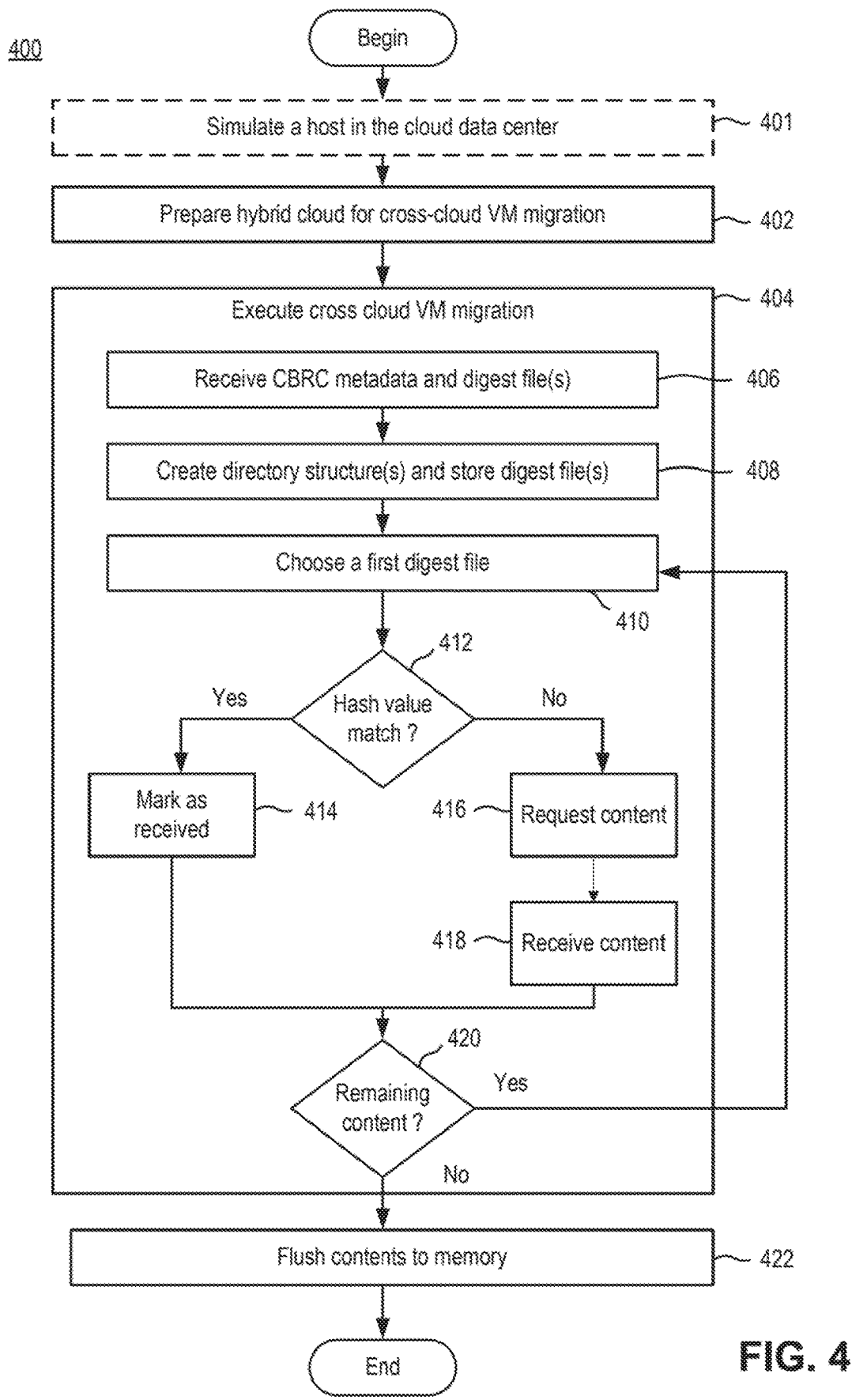
FIG. 4 is a flowchart illustrating a method of the high-level steps performed by a peer agent on the cloud computing system of FIG. 1, according to one embodiment disclosed herein.

FIG. 4 is a flowchart illustrating a method 400 of the high-level steps performed by the peer agent 204 on the cloud data center 150. At step 402, hybrid cloud computing system 100 prepares for cross-cloud VM migration. As shown in FIG. 2, a VM 120 executing on a host 104 (the "source host") in on-premise data center 102 is to be migrated to cloud data center 150.

Referring to FIG. 4, at step 404, hybrid cloud computing system 100 executes cross-cloud VM migration to migrate VM 120 from on-premise data center 102 to cloud data center 150. Step 404 includes sub-steps 406-420. At sub-step 406, the peer agent 204 receives the CBRC metadata 214 and the digest files 212 from the migration assist agent 202 on the on-premise data center. The metadata 214 includes the contents of memory. For example, the metadata 214 includes ram buffers, hash files already loaded into memory, information on how to generate the data structures for each vmdk 210, and the like.

At sub-step 408, the peer agent 204 creates the necessary directory structure and stores the digest files 212 therein. For example, the peer agent 204 is able to create the one or more directory structures based on the information available in the CBRC cache metadata. The peer agent 204 then stores the digest files 212 in their respective directory structure.

At sub-step 410, the peer agent 204 chooses a first digest file 212 from the digest files received from the on-premise data center 102. At sub-step 412, the peer agent 204 compares the first digest file 212 to the contents of the CBRC 206. For example, the peer agent 204 may compare the hash value in the first digest file 212 to one or more hash values in the CBRC 206. If the peer agent 204 determines that a match is found, at sub-step 414, the peer agent 204 marks the page in the CBRC 206 as received. Referencing the digest file 212 against the CBRC 206 ensures that duplicate data is not being received from the on-premise data center 102 by the cloud data center 150. Thus, only unique pages are transmitted from the migration assist agent 202 to the peer agent 204. The peer agent 204 may then update reference of the digest file to the corresponding page in the CBRC 206.

If, however, the peer agent 204 determines that a match is not found between the digest file and the CBRC, then at sub-step 416 the peer agent 204 communicates with the migration assist agent 202 to transmit the contents that are not part of the CBRC. Thus, the peer agent 204 works with the migration assist agent 202 in providing a lightweight migration process that does not transmit duplicate files. At sub-step 418, the peer agent 204 receives the requested contents from the migration assist agent 202. The peer agent 204 stores the requested contents corresponding to the first digest file in their appropriate constructs.

At sub-step 420, the peer agent 204 determines if there are any remaining digest files to be compared to the contents of the CBRC 206. If the peer agent 204 determines that there are additional digest files 212 to be checked, the method 400 reverts to sub-step 410 to determine whether the contents of the digest file 212 are already in the CBRC 206. If the peer agent 204 determines that there are no remaining digest files 212, then at step 422, the peer agent 204 flushes the contents to memory.

In some embodiments, method 400 may include step 401. At step 401, the host simulator 222 in the peer agent 204 simulates a host 162 in the cloud data center 150. For example, the host simulator 222 can simulate the host 162 in terms of receiving and transmitting the appropriate messages to a virtualization manager that makes it appears as an actual host computer eligible for hosting VMs. As such, the host simulator 222 can simulate the host 162 as one that is compatible with a host 104 in the cloud data center 150. For example, if a host 104 in the on-premise data center 102 is an ESX host, the host simulator 222 can simulate the host 162 to be an ESX host as well. The compatibility helps achieve migration of virtual machines across clouds that are built on the VMware software stack. Thus, the on-premise data center 102 and the cloud data center 150 can be heterogeneous in terms of their implementation.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of migrating one or more virtualized computing instances between source and destination virtualized computing systems, comprising:

executing a first migration workflow in the source virtualized computing system, where one or more host computers in the source virtualized computing system executing the one or more virtualized computing instances are source hosts in the first migration workflow, the executing of the first migration workflow causing a migration assist agent to perform steps comprising:

generating, in the source virtualized computing system, a content based read cache (CBRC) in memory and one or more digest files on disk, wherein the one or more digest files respectively associated with one or more virtualized computing instance files corresponding to virtual disks of the one or more virtualized computing instances, each of the one or more digest files comprising hash values for blocks in its associated virtual computing instance file, the CBRC comprising one or more memory pages corresponding to the one or more virtualized computing instances and one or more hash values corresponding to the one or more memory pages;

transmitting the one or more digest files from the source virtualized computing system to the destination virtualized computing system;

transmitting the one or more memory pages and the one or more hash values of the CBRC to the destination virtualized computing system; and for each of the one or more virtualized computing instance files to be transmitted to the destination virtualized computing system based on corresponding to the one or more virtualized computing instances being migrated:

referencing, in the source virtualized computing system, a digest file of the one or more digest files corresponding to the virtualized computing instance file with the CBRC to determine if at least one hash value in the digest file is also in a CBRC at the destination virtualized computing system, responsive to determining that the at least one hash value in the digest file is in the CBRC at the destination virtualized computing system, marking, by the migration assist agent, the virtualized computing instance file as complete and refraining from transmitting the virtualized computing instance file corresponding to the digest file of the one or more digest files to the destination virtualized computing system, and responsive to determining that the at least one hash value in the digest file is not in the CBRC at the destination virtualized computing system, transmitting the virtualized computing instance file, corresponding to the digest file of the one or more digest files to the destination virtualized computing system.

2. The method of claim 1, wherein a second migration workflow executed in the destination virtualized computing system comprises:
   receiving, at the destination virtualized computing system, the one or more digest files;
   creating, at the destination virtualized computing system, one or more directory structures for each of the one or more digest files;
   for each digest file at the destination virtualized computing system, comparing, at the destination virtualized computing system, a hash value contained therein to the one or more hash values in the CBRC at the destination virtualized computing system; and
   responsive to determining that the hash value for a first digest file is in the CBRC, marking a memory page that is associated with the first digest file and in the CBRC at the destination virtualized computing system as received.

3. The method of claim 2, the second migration workflow further comprising:
   responsive to determining that another hash value for a second digest file is not in the CBRC, requesting a second memory page to be transmitted from the source virtualized computing system.

4. The method of claim 2, the first migration workflow further comprising:
   simulating a destination host in the source virtualized computing system, such that the destination host is compatible with a source host in the source virtualized computing system.

5. The method of claim 1, wherein a second migration workflow executed in the destination virtualized computing system comprises:
   simulating a source host in the destination virtualized computing system, such that the source host is compatible with a destination host in the destination virtualized computing system.

6. A computer system, comprising:
   a processor; and
   a memory storing program code, which, when executed on the processor, performs a method of migrating a one or more virtualized computing instances between source and destination virtualized computing systems, the method comprising:
      executing a first migration workflow in the source virtualized computing system, where one or more host computers in the source virtualized computing system executing the one or more virtualized computing instances are source hosts in the first migration workflow, the executing of the first migration workflow causing a migration assist agent to perform steps comprising:
         generating, in the source virtualized computing system, a content based read cache (CBRC) in memory and one or more digest files on disk, wherein the one or more digest files respectively associated with one or more virtualized computing instance files corresponding to virtual disks of the one or more virtualized computing instances, each of the one or more digest files comprising hash values for blocks in its associated virtual computing instance file, the CBRC comprising one or more memory pages corresponding to the one or more virtualized computing instances and one or more hash values corresponding to the one or more memory pages;
         transmitting the one or more digest files from the source virtualized computing system to the destination virtualized computing system;
         transmitting the one or more memory pages and the one or more hash values of the CBRC to the destination virtualized computing system; and
         for each of the one or more virtualized computing instance files to be transmitted to the destination virtualized computing system based on corresponding to the one or more virtualized computing instances being migrated:
            referencing, in the source virtualized computing system, a digest file of the one or more digest files corresponding to the virtualized computing instance file with the CBRC to determine if at least one hash value in the digest file is also in a CBRC at the destination virtualized computing system,
            responsive to determining that the at least one hash value in the digest file is in the CBRC at the destination virtualized computing system, marking, by the migration assist agent, the virtualized computing instance file as complete and refraining from transmitting the virtualized computing instance file corresponding to the digest file of the one or more digest files to the destination virtualized computing system, and
            responsive to determining that the at least one hash value in the digest file is not in the CBRC at the destination virtualized computing system, transmitting the virtualized computing instance file, corresponding to the digest file of the one or more digest files to the destination virtualized computing system.

7. The computer system of claim 6, wherein a second migration workflow executed in the destination virtualized computing system comprises:
   receiving, at the destination virtualized computing system, the one or more digest files;
   creating, at the destination virtualized computing system, one or more directory structures for each of the one or more digest files;
   for each digest file at the destination virtualized computing system, comparing, at the destination virtualized computing system, a hash value contained therein to the one or more hash values in the CBRC at the destination virtualized computing system; and
   responsive to determining that the hash value for a first digest file is in the CBRC, marking a memory page that is associated with the first digest file and in the CBRC at the destination virtualized computing system as received.

8. The computer system of claim 7, the second migration workflow further comprising:
   responsive to determining that another hash value for a second digest file is not in the CBRC, requesting a second memory page to be transmitted from the source virtualized computing system.

9. The computer system of claim 7, the first migration workflow further comprising:

simulating a destination host in the source virtualized computing system, such that the destination host is compatible with a source host in the source virtualized computing system.

10. The computer system of claim 6, wherein a second migration workflow executed in the destination virtualized computing system comprises:
    simulating a source host in the destination virtualized computing system, such that the source host is compatible with a destination host in the destination virtualized computing system.

11. The computer system of claim 6, wherein there is a one-to-one correspondence between digest files and virtualized computing instance files.

12. A non-transitory computer readable medium comprising instructions, which when executed in a computer system, causes the computer system to carry out a method of migrating one or more virtualized computing instances between source and destination virtualized computing systems, the method comprising:
    executing a first migration workflow in the source virtualized computing system, where one or more host computers in the source virtualized computing system executing the one or more virtualized computing instances are source hosts in the first migration workflow, the executing of the first migration workflow causing a migration assist agent to perform steps comprising:
        generating, in the source virtualized computing system, a content based read cache (CBRC) in memory and one or more digest files on disk, wherein the one or more digest files respectively associated with one or more virtualized computing instance files corresponding to virtual disks of the one or more virtualized computing instances, each of the one or more digest files comprising hash values for blocks in its associated virtual computing instance file, the CBRC comprising one or more memory pages corresponding to the one or more virtualized computing instances and one or more hash values corresponding to the one or more memory pages;
        transmitting the one or more digest files from the source virtualized computing system to the destination virtualized computing system;
        transmitting the one or more memory pages and the one or more hash values of the CBRC to the destination virtualized computing system; and
        for each of the one or more virtualized computing instance files to be transmitted to the destination virtualized computing system based on corresponding to the one or more virtualized computing instances being migrated:
            referencing, in the source virtualized computing system, a digest file of the one or more digest files corresponding to the virtualized computing instance file with the CBRC to determine if at least one hash value in the digest file is also in a CBRC at the destination virtualized computing system,
            responsive to determining that the at least one hash value in the digest file is in the CBRC at the destination virtualized computing system, marking, by the migration assist agent, the virtualized computing instance file as complete and refraining from transmitting the virtualized computing instance file corresponding to the digest file of the one or more digest files to the destination virtualized computing system, and
            responsive to determining that the at least one hash value in the digest file is not in the CBRC at the destination virtualized computing system, transmitting the virtualized computing instance file, corresponding to the digest file of the one or more digest files to the destination virtualized computing system.

13. The non-transitory computer readable medium of claim 12, wherein a second migration workflow executed in the destination virtualized computing system comprises:
    receiving, at the destination virtualized computing system, the one or more digest files;
    creating, at the destination virtualized computing system, one or more directory structures for each of the one or more digest files;
    for each digest file at the destination virtualized computing system, comparing, at the destination virtualized computing system, a hash value contained therein to the one or more hash values in the CBRC at the destination virtualized computing system; and
    responsive to determining that the hash value for a first digest file is in the CBRC, marking a memory page that is associated with the first digest file and in the CBRC at the destination virtualized computing system as received.

14. The non-transitory computer readable medium of claim 13, the second migration workflow further comprising:
    responsive to determining that another hash value for a second digest file is not in the CBRC, requesting a second memory page to be transmitted from the source virtualized computing system.

15. The non-transitory computer readable medium of claim 13, the first migration workflow further comprising:
    simulating a destination host in the source virtualized computing system, such that the destination host is compatible with a source host in the source virtualized computing system.

16. The non-transitory computer readable medium of claim 12, wherein a second migration workflow executed in the destination virtualized computing system comprises:
    simulating a source host in the destination virtualized computing system, such that the source host is compatible with a destination host in the destination virtualized computing system.

* * * * *